Aug. 19, 1947.  E. H. HERSHOWITZ  2,426,099
DRAFT COUPLING
Filed May 30, 1945
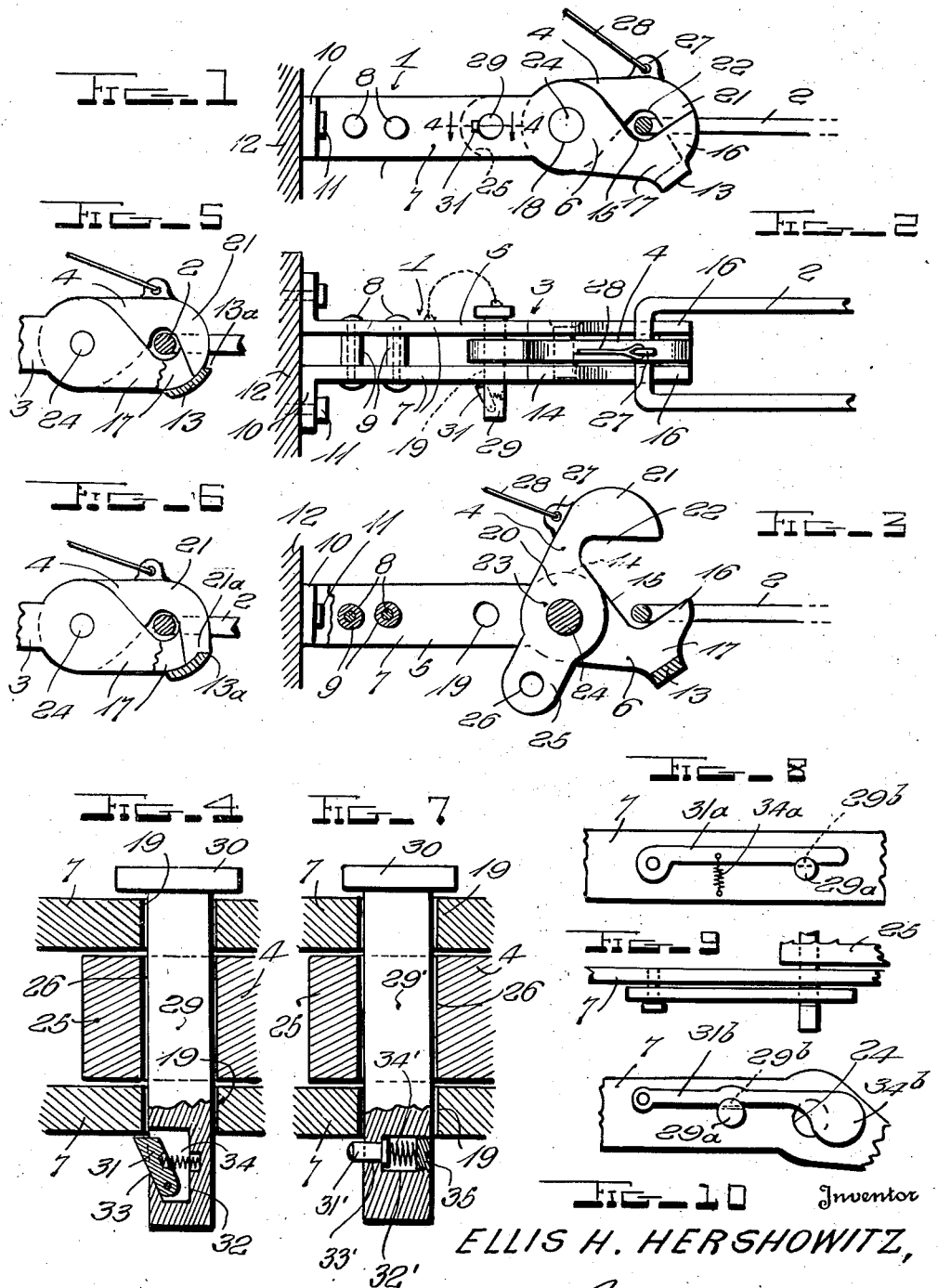
Inventor
ELLIS H. HERSHOWITZ,
Attorney Patented Aug. 19, 1947

2,426,099

UNITED STATES PATENT OFFICE 2,426,099

DRAFT COUPLING

Ellis H. Hershowitz, Washington, D. C.

Application May 30, 1945, Serial No. 596,774

5 Claims. (Cl. 280—33.15)

This invention relates to certain new and useful improvements in draft couplings or hitches for coupling a vehicle which is to be pushed or towed with another vehicle used to push or tow it. The invention particularly relates to a safety draft hook, or coupling which may be readily and quickly attached to or detached from a coacting coupling. More particularly the invention relates to a draft hook or coupling of a safety type which is proof against accidental release under draft pulls or strains and which is not liable to be affected and rendered inoperative by climatic changes or weather conditions.

The draft hook or cable embodying my invention may be used for pushing or towing airplanes, trucks, flat cars, trailers or other vehicles by or from any other type of motor vehicle, but is especially designed for towing airplanes from point to point on an airfield or extricating stalled vehicles, where the use of a quick attachable and detachable safety coupling which will not be jarred or otherwise released under pulling strains from a towing cable is especially desirable. In towing airplanes, for example, the couplings in common use are often unhooked or jarred free under motions due to uneven terrain or when sharp turns are made, resulting in loss of time in recoupling and possible damage to the airplane being towed. The couplings of the types in common use are also liable to be clogged by dirt, dust, ice or snow and their fastenings rendered difficult to operate in cold weather or where frozen, so that time is lost in operating them. The loss of time and possible damage to the airplane, truck or other vehicle used in military operations thus occasioned ofttimes causes serious disadvantages, particularly in wartimes when haste is required in towing a vehicle to a point for service or to a point out of danger during military actions.

One object of my invention is to provide a draft hook or coupling which is free from such objections to prior couplings in general use.

Another object of my invention is to provide a coupling which cannot be jarred or otherwise accidentally released when in service, due to irregular motions or sharp vehicle turns.

Still another object of my invention is to provide a coupling which can be easily and quickly coupled and uncoupled, and which is not liable to be affected by climatic changes or to be rendered inoperative by rain, snow, sleet, dust or other weather or air conditions.

Still another object of my invention is to provide a coupling which is strong and durable and designed to withstand heavy and sudden draft strains, and which is self-reinforcing and adapted to be securely held in coupling position and prevented from being jarred or otherwise accidentally released under draft strains.

With these and other objects in view, the invention consists in the novel features of construction, combination and relationship of parts, hereinafter fully described and claimed, and as shown in the accompanying drawing; in which:

Fig. 1 is a view in side elevation of a draft hook or coupling constructed in accordance with my invention, showing the same in closed position and in engagement with a cracking coupling, a part of the latter appearing in section.

Fig. 2 is a top plan view of the elements shown in Fig. 1.

Fig. 3 is a vertical longitudinal section through the coupling, showing the same in open position.

Fig. 4 is a detail section on an enlarged scale taken on line 4—4 of Fig. 1.

Figs. 5 and 6 are detail views showing modifications in the construction of the joins of the coupler.

Fig. 7 is a view similar to Fig. 4 showing a modification in the lock for holding the fastening pin from displacement.

Fig. 8 is a side elevation of the coupling showing the use of a pivoted latch to hold the pin in place.

Fig. 9 is a plan view of parts shown in Fig. 8.

Fig. 10 is a view similar to Fig. 8 showing the use of another type of latch for holding the pin in place.

Referring now more particularly to Figs. 1 to 4, inclusive, of the drawing, 1 designates my improved draft hook or coupling which is designed to be attached to a vehicle which is to be pushed or towed and to be connected to a link or eye 2 comprising or forming part of a coacting coupling attached to the pulling or towing vehicle, and which link or eye, in practice, if desired, may be arranged at the end of a tow rope, chain or cable leading from the towing vehicle.

The hook or coupling 1 comprises relatively stationary and movable members 3 and 4. The member 3 has a body or shank portion 5 and a duplex jaw or hook portion 6. The body or shank portion 5 consists of a pair of spaced parallel comparatively narrow flat bars or plates 7, set edgewise in a vertical plane and held spaced apart in the region of their inner or rear ends by spacing rivets 8 and thimbles 9. At their rear ends the bars or plates 7 are provided with apertured flanges 10 or the like for passage of fastenings 11 to secure the same to a part 12, which may be a part of the vehicle to be towed or a member adapted for attachment to such vehicle. The duplex hook or jaw 6 is arranged at the forward end of the body or shank 5 and consists of spaced jaw plates integral with and formed by continuations of the bars or plates 7, said jaw plates being united and held in spaced relation by an integral transversely disposed bridge piece 13. The described continuation of the member 3 adapts it to be stamped out of flat metal and bent into shape, so that a strong and durable metal may be used and economy of manufacture with rapidity of production insured.

The hook or jaw portion 6 of the member 3, which forms a pair of spaced jaws, is of novel formation. As shown, the jaws 6 are connected at their rear ends with the plates 7 by bearing portions 14 of circular outline and greater depth than the plates 7 and the jaws 6 are offset from the horizontal plane of the plates so as to project at a downward and forward angle from the bearing portions 14. Each jaw 6 has a recessed upper portion 15 terminating in an upturned bill 16 and the lower edge of the jaw and base of the bill merge into a downwardly projecting lug or extension 17, the lugs or extensions 17 of the two jaws 16 being connected by the bridge piece 13. In the bearing portions 14 are formed bearing openings 18 and in the plates 7, in rear of the openings 18, are formed openings 19.

The movable jaw 4 has a body or bearing portion 20 of circular outline and a bill 21, the forward edges of the portion 20 and lower edge of the bill being shaped to form a recess 22 for coaction with the recesses 15 of the jaws 6 to form a keeper opening to receive the link or eye 2 when said jaws are in closed position. The bearing portion 20 of the jaw 4 fits between the bearing portions 14 of the jaws 6 and has a bearing opening 23, and a pin 24 passing through the bearing openings 18 and 23 in the jaws pivotally connects the jaw 4 with the jaws 6 to swing downward to closed position and upward to open position. At the rear of the jaw 4 is an arm or tail piece 25 having an opening 26 therein adapted to register with the openings 19 when the jaw 4 is closed. A lug 27 may be provided on the bill 21 for the attachment of a pull cord or cable 28 whereby the movable jaw 4 may be swung open by an operator from the towing vehicle or from the ground to avoid the necessity of the operator coming between the towing and towed vehicles for this purpose.

It will be understood that in a coupling operation the jaw 4 may be held open by the cord 28 until the link 2 is entered in the recesses 15 of the jaws 6 and the jaw 4 then allowed to drop by joints into coupling position, the forward or bill portion 21 of the jaw 4 being of preponderant weight to adapt it to so close. When the jaw 4 moves to closed position its bill 21 folds down between the bills 16 of the jaws 6 and rests at its nose on the bridge piece 13 and the tail piece 25 folds upwardly between the shank plates 7, so that the movable jaw 4 will be interlocked with the stationary jaw 3 against lateral play or movement, by which wear and tear on the parts or liability of breakage due to lateral strains in a pushing or towing action will be prevented. Also it will be observed that when the coupling is thus closed the parts 2 and 24 will be arranged by the offsetting of the jaws 6 in register in the center line of the coupling, so that the members 3 and 4 will be mutually braced and reinforced to effectually withstand all lateral and longitudinal draft strains. The construction of the coupling, whereby the parts are thus interlocked and braced, enables a coupling which is simple of construction and of light weight, but strong and durable, to be produced at a comparatively low cost.

In order to hold the coupling member 4 closed, a fastening pin 29 is provided for passage through the openings 19 and 26 in the shank plates 7 and tail piece 25. This pin has a retaining head 30 at one end and carries a locking dog 31 at its opposite end. This dog is pivoted at one end in a recess 32 in the pin and its opposite or free end is movable outwardly and inwardly through an opening 33 communicating with the recess, a spring 34 being provided in the recess to normally press the dog outwardly. The outer wall of the recess 32 is inclined so that the dog projects outward at an angle and pressure on the outer side of the dog will force it inwardly. By this construction when the tail piece 25 of the dog 4 is arranged in locking position but a single continuous sliding movement of the pin through its receiving openings from one side of the coupling is required to apply and lock it, the dog being automatically pressed back until the pin is fully inserted and then automatically springing outward to locking position. To remove the pin it is simply necessary to press the dog inward, whereupon the pin may be withdrawn without resistance. This fastening means ensures the secure holding of the jaw 4 in closed position against any possibility of accidental release under vibrations, jars, or other movements, while at the same time enabling coupling and uncoupling operations to be easily and quickly performed. When held closed the jaw 4 is proof against opening under up and down movements due to travel over rough terrain and against lateral strains due to quick turning actions, under which prior couplings are liable to be released. The interbracing actions of the closed jaws also prevents twisting movements being thrown on the jaw 4 or pivot 24 under lateral draft forces. Other advantages incident to my improved construction of coupling are that when the coupling is open, dirt, dust, ice or snow may freely pass through it and any adhering to it may be easily removed; that entrance of foreign particles is largely prevented when the jaw 4 is closed; and the jaw 4 in its opening and closing movements renders the coupling self cleaning. The construction of the coupling and its fastening pin further allows ready manipulation and insertion and removal of the pin even with numb hands in cold weather.

Fig. 5 shows a modification in the coupler construction in which the bridge piece 13 has an upward extension or lip 13a behind which the nose of the bill 21 of the jaw 4 moves and against which it rests when said jaw is in closed position, whereby the bridge piece relieves the pivot 24 from a part of the pull of link 2 on the bill 21 and the bill and pivot from overstrain.

Fig. 6 shows another modification in which the bridge piece is provided with the lip 13a and the bill 21 is provided with a broadened nose portion having a recess 21a forming a shoulder to bear on the inner face of the nose piece and a shoulder to overlap and bear on its upper edge, whereby both the pivot and the bridge piece are braced against forward pulling strains as well as vertical strains or shocks due to travel over rough terrain.

Fig. 7 shows a modification in which a fastening pin 29' similar to pin 29 is employed, but wherein a locking plunger 31' takes the place of the pivoted dog 31. This plunger is movable in a recess 32' formed in the pin and inwardly and outwardly through an opening 33' in a direction at right angles to the axis of the pin. A spring 34' normally presses the plunger outwardly and is disposed in the recess between the plunger and a plug 35 which closes the recess at the side opposite the opening 33'. The operation with this construction will be obvious and readily understood from the foregoing description relative to dog 31.

Figs. 8, 9 and 10 show further modifications in the construction of the fastening means. Figs. 8 and 9 show a construction in which the fastening pin 29a is provided with a keeper recess 29b which is adapted to be engaged by a dog 31a pivoted to the adjacent shank plate 7, a spring 34a serving to hold the dog normally in locking position. Fig. 10 shows a construction in which a similarly constructed fastening pin is used which is adapted to be engaged by a dog 31b pivoted at one end to the adjacent shank plate 7 and weighted at its opposite end 34b for a pivotal engaging action. The operation with these constructions will also be obvious and readily understandable from the foregoing description.

Figs. 1 and 2 show the coupling 1 in closed position and Fig. 3 the coupling in open position and it will be seen that by merely pulling upon and relaxing the cord 28 after removal of the pin 29 the jaw 4 will be opened to receive or free the link 2 and closed to hold the received link in coupled relation to the coupling 1. On the closing of the coupling the pin 29 may be easily applied to fasten the coupling members 3 and 4 against, and when it is desired to open the coupling again the pin 29 may be as easily removed to free the jaw 4. The advantages of the coupling have been heretofore fully described and need not be reported, as these advantages will be fully understood and appreciated by those versed in the art of towing certain vehicles, airplanes, for example, where the use of a safe coupling is a desideration in order to save time in towing and in preventing damage to the tow.

While the constructions shown herein are preferred it is to be understood that changes in the form, construction and arrangement of parts, falling within the scope of the appended claims, may be made without departing from the spirit or sacrificing any of the advantages of the invention.

Having thus described my invention, I claim:

1. A draft hook comprising a stationary member embodying a horizontally disposed shank formed of a pair of spaced parallel plates set edgewise in a vertical plane and terminating at their forward ends in a pair of spaced parallel, stationary hook-shaped jaws, and a movable member carrying a coacting jaw and arranged between and pivoted to the plates to swing its jaw upwardly to open position and downwardly to closed position relatively to the stationary jaws, said stationary jaws being provided with keeper recesses opening outwardly through their upper edges and whose bottom portions are arranged substantially in the horizontal plane of the pivot of the movable member and being provided with bill portions lying in advance of said recesses and projecting upwardly above the horizontal plane of the pivot of the movable member, the said jaw of the movable member being provided with a keeper recess opening outwardly through its lower edge and with a downwardly projecting bill portion and respectively disposed so that in the downward movement of said jaw to a closed position its recess forms with the recesses of the stationary jaws a keeper opening and its bill folds between the bills of the stationary jaws and below the plane of the pivot of the movable member so as to hold a coacting coupling confined in the recesses between the jaws substantially in the horizontal plane of said pivot.

2. A draft hook comprising a stationary member embodying a horizontally disposed shank formed of a pair of spaced parallel plates set edgewise in a vertical plane and terminating at their forward ends in a pair of spaced parallel, hook-shaped jaws, and a movable member carrying a coacting hook-shaped jaw and arranged between and pivoted to the plates to swing its jaw upwardly to open position and downwardly to closed position relatively to the stationary jaws, said stationary jaws being provided with keeper recesses opening outwardly through their upper edges and whose bottom portions are arranged substantially in the horizontal plane of the pivot of the movable member and being provided with bill portions lying in advance of said recesses and projecting upwardly above the horizontal plane of the pivot of the movable member, and said jaw of the movable member being provided with a keeper recess opening outwardly through its lower edge and with a downwardly projecting bill portion lying in advance thereof, said recess and bill portion being so relatively disposed with respect to each other and to the pivot that in the downward movement of said jaw its recess forms with the recesses of the stationary jaws a transverse keeper passage and its bill folds between the bills of the stationary jaws to lap therewith above and below the plane of the pivot member of the movable jaw so as to adapt a coacting coupling member to be held confined in the passage substantially in the horizontal plane of said pivot and the draft shown to be transmitted along a horizontal line coincident therewith.

3. A draft hook comprising a stationary member embodying a horizontally disposed shank formed of a pair of spaced parallel plates set edgewise in a vertical plane and terminating at their forward ends in a pair of spaced parallel, hook-shaped jaws, and a movable member carrying a coacting hook-shaped jaw and arranged between and pivoted to the plates to swing its jaws upwardly to open position and downwardly to closed position relative to the stationary jaws, said stationary jaws being provided with keeper recesses opening outwardly through their upper edges and whose bottom portions are arranged substantially in the horizontal plane of the pivot of the movable member and being provided with bill portions lying in advance of said recesses and projecting upwardly above the horizontal plane of the pivot of the movable member and with a bridge piece uniting said jaws below the plane of the pivot, said jaws of the movable member being provided with a keeper recess opening outwardly through its lower edge and with a downwardly projecting bill portion lying in advance thereof, said recess and bill portion being so relatively disposed with relation to each other and to the pivot that in the downward movement of said jaw its recess forms with the recesses of the stationary jaws a transverse keeper passage and its bill folds between the bills of the stationary jaws to lap therewith above and below the plane of the pivot and to abut against the bridge piece below the plane of the pivot so as to adapt a coacting coupling member to be held confined in the passage substantially in the horizontal plane of said pivot and the draft strain to be transmitted above a line coincident with the pivot.

4. A draft hook comprising a stationary member embodying a horizontally disposed shank formed of a pair of spaced parallel plates set edgewise in a vertical plane and terminating at their forward ends in a pair of spaced parallel, hook-shaped jaws, and a movable member having a tail piece at its rear end and carrying a coacting hook-shaped jaw and at its forward end and being arranged between and pivoted to the plates to swing its jaw upwardly to open position and downwardly to closed position relatively to the stationary jaws, said stationary jaws being provided with keeper recesses opening outwardly through their upper edges and whose bottom portions are arranged substantially in the horizontal plane of the pivot of the movable member and being provided with bill portions lying in advance of said recesses and projecting upwardly above the horizontal plane of the pivot of the movable member, said jaw of the movable member being provided with a keeper recess opening outwardly through its lower edge and with a downwardly projecting bill portion lying in advance thereof, said recess and bill portion being so relatively disposed with respect to each other and to the pivot that in the downward movement of said jaw its recess forms with the recesses of the stationary jaws a transverse keeper passage and its bill folds between the bills of the stationary jaws to lap therewith and below the plane of the pivot member of the movable jaw so as to adapt a coacting coupling member to be held confined in the passage substantially in the horizontal plane of said pivot and the draft strain to be transmitted along a horizontal line coincidental therewith, and fastening means for securing the tail piece of the movable member in its closed position to the shank of the stationary member in the horizontal plane of the pivot.

5. A draft hook comprising a stationary member embodying a horizontally disposed shank formed of a pair of spaced parallel plates set edgewise in a vertical plane and terminating at their forward ends in a pair of spaced parallel, hook-shaped jaws, a movable member carrying a coacting hook-shaped jaw and arranged between and pivoted to the plates to swing its jaw upwardly to open position and downwardly to closed position relatively to the stationary jaws, said stationary jaws being provided with keeper recesses opening outwardly through their upper edges and with bill portions lying in advance of said recesses, said jaws being offset downwardly to dispose the bottom portions of the recesses in line with the pivot of the movable member and the bills of the jaws below the upper edges of the plates but projecting upwardly above the horizontal plane of the pivot of the movable member, the said jaw of the movable member being provided with a keeper recess opening outwardly through its lower edge and with a downwardly projecting bill portion, said recess and bill portion being so disposed that in the downward movement of said jaw its recess forms with the recesses of the stationary jaws a transverse keeper passage located in the horizontal plane of the pivot and its bill folds between the bills of the stationary jaws below the horizontal plane of the pivot to adapt a coacting coupling member to be held confined in the passage substantially in the horizontal plane of said pivot.

ELLIS H. HERSHOWITZ.

REFERENCES CITED

The following references are of record in the file of this patent:

UNITED STATES PATENTS

| Number | Name | Date |
|---|---|---|
| 795,966 | George | Aug. 1, 1905 |
| 2,221,492 | Sawyer | Nov. 12, 1940 |
| 2,269,806 | Brecka | Jan. 13, 1942 |